J. Balmore,
Wrench.
No. 2,600. Reissued May 14, 1867.
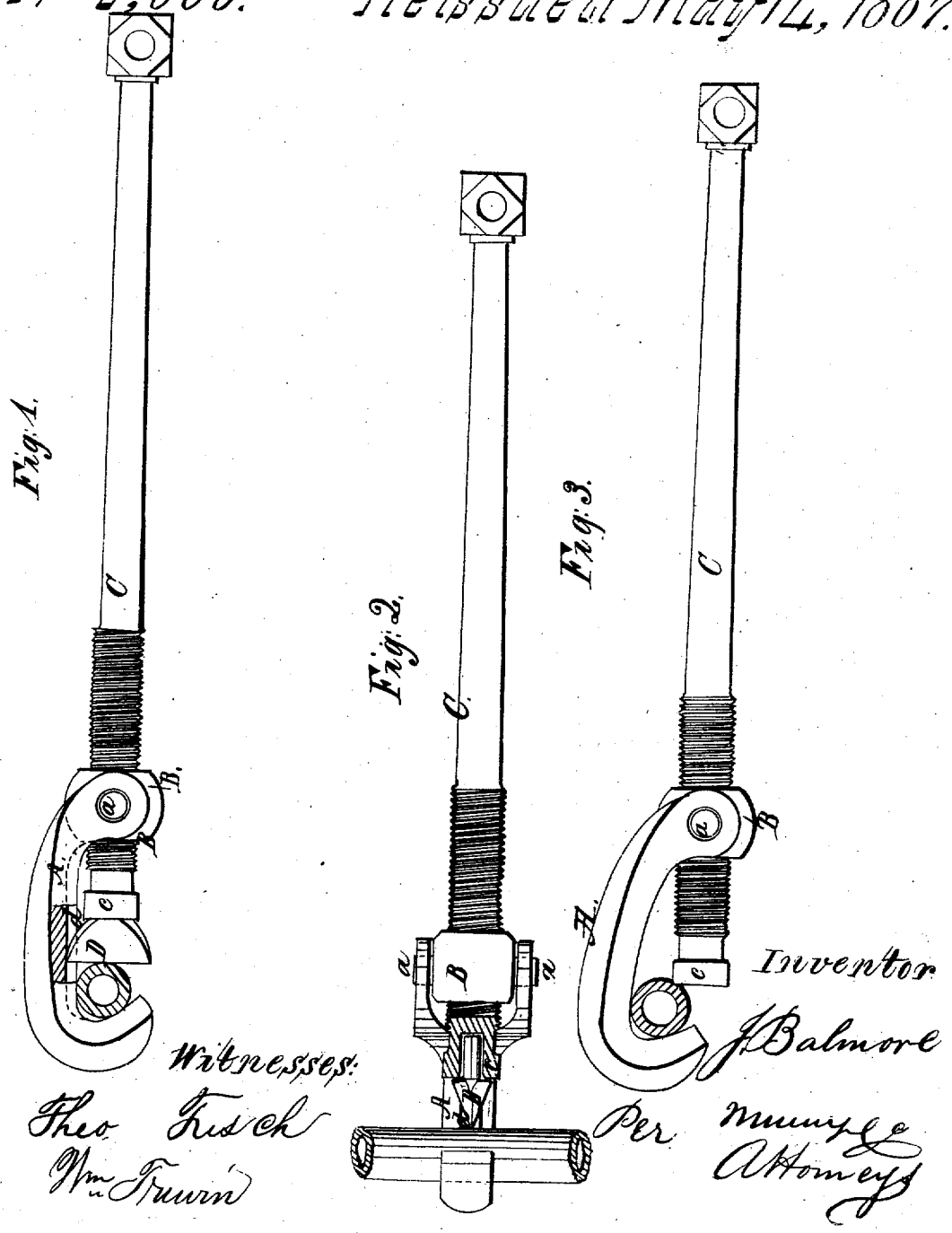
N. PETERS, PHOTO-LITHOGRAPHER, WASHINGTON, D. C.

United States Patent Office.

JOHN BALMORE, OF HARLEM, NEW YORK.

*Letters Patent No.* 62,177, *dated February* 19, 1867; *reissue No.* 2,600, *dated May* 14, 1867.

IMPROVED PIPE-CUTTER.

The Schedule referred to in these Letters Patent and making part of the same.

TO ALL WHOM IT MAY CONCERN:

Be it known that I, JOHN BALMORE, of Harlem, in the county and State of New York, have invented a new and useful improvement in Pipe-Tongs and Cutter; and I do hereby declare that the following is a full, clear, and exact description thereof, which will enable those skilled in the art to make and use the same, reference being had to the accompanying drawing, forming part of this specification, in which drawing—

Figure 1 represents a side elevation of this invention when the same is used as a cutter.

Figure 2 is a front elevation of the same.

Figure 3 is a side elevation of the same when used as tongs.

Similar letters of reference indicate corresponding parts.

This invention relates to a tool which can be used with great advantage for screwing up and unscrewing pipes of any description, and also for cutting pipes or solid metal bars. It is provided with a swivel hook, which catches over the pipe to be screwed in or out, and which is hung on gudgeons projecting from the ends of a nut, into which the shank of the tool is tapped. The end of this shank forms a round cup-shaped point, the edge of which is so formed that it can be brought to bear against the circumference of the pipe to be screwed in or out. A hole bored in the centre of this point serves to receive the cutter, the edge of which drops into a groove in the inner surface of the hook, so that the cutter is prevented from turning while its cutting edge is set up against the pipe or bar to be cut.

A represents a hook made of steel, wrought iron, or any other suitable material, and of such a shape that the same will catch conveniently over the pipe to be acted on. Said hook swings on gudgeons *a*, which project from the ends of a nut, B, that is tapped to receive the screw *b* on the shank C of the tool in such a manner that when the hook is attached to a pipe, the shank, together with the nut, can swing back and forth freely. The end of the shank C, which projects through the nut B, terminates in a round, cup-shaped point, *c*, the edge of which is made to bear against the pipe, when the same is to be screwed in or out in the manner shown in fig. 3 of the drawing. Said point is made circular, so that the shank can be turned in either direction without throwing the edge of the flat point off from the pipe, and consequently the position of the point in relation to the pipe can be adjusted with ease and facility, and the edge of said point can be brought to bear on the circumference of pipes of different sizes so that it bites into the same and allows of turning the pipes in or out, and at the same time the point readily disengages itself, as soon as the shank of the tool is turned back in the direction of the arrow marked on it in fig. 3. In this respect my invention is superior to that of John Charles Johnson, patented April 26, 1864, which also shows the hinged hook, the nut and the shank with the flat point. But his point is intended to bear on the pipe with its flat inclined serrated face, and if great power is applied to the shank, said inclined face binds on the pipe so hard that it is difficult to disengage it from the same, and in turning the wrench back the pipe must be held, in order to prevent it from turning back also. And, furthermore, the point in Johnson's wrench is square, and being inclined, the highest corner only could be brought to bear against the circumference of the pipe, and the wrench cannot be used in the manner in which I propose to use my wrench, except, perhaps, for one size of pipes. By using a flat, cup-shaped point I obtain a sharp edge to bear against the circumference of the pipe, no matter in what direction the shank may be turned; and, furthermore, an even surface is obtained for the cutter, which will be presently described. The flat-pointed end of the shank C is bored out to receive the cutter D. If this cutter is in position, its shoulder rests on the flat end of the point, and its edge drops into the groove *d* in the inner surface of the hook A, so that the shank C can be turned without turning the cutter. Said cutter can thus be set up against a pipe or bar to be cut, and pipes or round bars of different sizes can be cut with ease and facility.

I do not claim as my invention the hook-shaped jaw hinged to a nut through which the shank of the tool is screwed; but what I claim as new, and desire to secure by Letters Patent, is—

1. In a pipe-wrench with a hook-shaped jaw hinged to a nut, through which the shank passes, the round, cup-chaped point *c* to operate in combination with the hinged hook-shaped jaw A, in the manner and for the purpose set forth.

2. The cutter D and groove *d*, in combination with the shank C, nut B, and hook A, constructed, arranged, and operating substantially as and for the purposes set forth.

This specification signed by me this 4th day of March, 1867.

JOHN BALMORE.

Witnesses:

W. HAUFF,

AMASA A. REDFIELD.